United States Patent
Kato et al.

(10) Patent No.: US 8,282,157 B2
(45) Date of Patent: Oct. 9, 2012

(54) SUNROOF SYSTEM INCLUDING A SUNROOF PANEL AND A SUNSHADE PANEL

(75) Inventors: Takashi Kato, Sakura (JP); Ryosuke Noro, Sakura (JP)

(73) Assignee: Yachiyo Industry Co., Ltd., Sayama-Shi, Saitama (JP)

( * ) Notice: Subject to any disclaimer, the term of this patent is extended or adjusted under 35 U.S.C. 154(b) by 295 days.

(21) Appl. No.: 12/793,891

(22) Filed: Jun. 4, 2010

(65) Prior Publication Data

US 2010/0327633 A1      Dec. 30, 2010

(30) Foreign Application Priority Data

Jun. 29, 2009 (JP) .................. 2009-153503

(51) Int. Cl.
*B60J 7/043* (2006.01)
*B60J 7/057* (2006.01)

(52) U.S. Cl. ....................... 296/214; 296/223
(58) Field of Classification Search .................. 296/223, 296/214
See application file for complete search history.

(56) References Cited

U.S. PATENT DOCUMENTS

| | | | | |
|---|---|---|---|---|
| 6,056,352 A | * | 5/2000 | Ewing et al. | .................. 296/214 |
| 6,592,178 B2 | * | 7/2003 | Schober et al. | ................ 296/214 |
| 7,828,375 B2 | * | 11/2010 | Honjo et al. | ............. 296/216.03 |
| 7,905,543 B2 | | 3/2011 | Ito | |
| 2008/0238154 A1 | | 10/2008 | Honjo | |

FOREIGN PATENT DOCUMENTS

| | | |
|---|---|---|
| DE | 102 12 006 A1 | 10/2003 |
| DE | 20 2005 020693 U1 | 6/2006 |
| JP | 2002 096640 A | 4/2002 |
| JP | 2002096640 | 4/2002 |
| JP | 2006327353 | 12/2006 |
| JP | 2008239040 | 10/2008 |
| JP | 2009046889 A | 3/2009 |

* cited by examiner

*Primary Examiner* — Dennis Pedder
(74) *Attorney, Agent, or Firm* — Marshall & Melhorn, LLC

(57) ABSTRACT

In a sunroof system including a sunroof panel and a sunshade panel that is configured to avoid pinching a foreign object with the sunroof panel or sunshade panel, when a pinching by one of the panels is detected, the other panel is controlled according to the information on the pinching by the one panel and the condition of the other panel so as to prevent the pinching of the same foreign object by the other panel.

5 Claims, 8 Drawing Sheets

SUNROOF SYSTEM INCLUDING A SUNROOF PANEL AND A SUNSHADE PANEL

TECHNICAL FIELD

The present invention relates to a sunroof system including a sunroof panel and a sunshade panel that is configured to avoid pinching an object with the sunroof panel or sunshade panel.

BACKGROUND OF THE INVENTION

Many of the passenger vehicles now on the market are fitted with a sunroof system that includes a sunroof panel for selectively closing an opening formed in the roof of the vehicle and a drive unit for opening and closing the sunroof panel as desired. In particular, the outer slide sunroof system is known as a typical form of sunroof systems in which the sunroof panel is configured to be tilted up from the fully closed position thereof before being slid rearward to a position located above the roof panel of the vehicle to fully expose the opening in the roof. It is also known to provide a sunshade panel below the sunroof panel so as to be open and close the opening as desired. See Japanese patent laid open publication No. 2006-327353, for example.

When the sunroof panel or sunshade panel is about to be closed from an open position, a foreign object such as the hand or head of a vehicle occupant or a drooping branch hanging from a tree could be caught in the path of the sliding movement of the panel, and may be eventually pinched by the panel. Therefore, a proposal has been made to have the movement of the sunshade panel precede the closing movement of the sunroof panel and detect an abnormal increase in the load of the drive unit for the sunshade panel so that the movement of the sunshade panel may be reversed or stopped upon detection of the pinching of a foreign object, and any inconvenience caused by a pinching of an object may be avoided. See Japanese patent laid open publication No. 2002-096640, for example.

Also, when a sunroof panel or a sunshade panel is moving from a closed position in an opening direction, a foreign object located outside the vehicle may be caught by the moving panel. A technology for preventing such an occurrence is proposed in Japanese patent laid open publication No. 2008-239040.

The sunroof panel and sunshade panel are required to open and close the opening in the roof in a coordinated manner, and it is necessary to coordinate the movements of the two panels when one of the panels encounters an obstacle. The prior art disclosed in patent document 2 is useful only when the sunshade panel pinches a foreign object, and is therefore unable to cope with a situation where a foreign object is pinched only by the sunroof panel. It is also unacceptable to close the sunshade panel ahead of the sunroof panel as it prevents for the vehicle operator to visually confirm that the sunroof panel is properly closed.

BRIEF SUMMARY OF THE INVENTION

In view of such problems of the prior art, a primary object of the present invention is to provide a sunroof system including a sunroof panel and a sunshade panel that allows the pinching of a foreign object to be avoided in a favorable manner.

A second object of the present invention is to provide a sunroof system that is configured to detect a pinching of either a sunroof panel or a sunshade panel, and use the information on the pinching of one of the panels for the control of the other panel.

According to the present invention, such an object can be accomplished by providing a sunroof system, comprising: a sunroof panel disposed on a fixed roof of a vehicle so as to be selectively moveable in an opening direction to expose an opening formed in the fixed roof and a closing direction to close the opening; a sunshade panel disposed on the fixed roof of the vehicle under the sunroof panel so as to be selectively moveable in an opening direction to expose the opening and a closing direction to close the opening; a first drive unit mounted on the roof for actuating the sunroof panel; a second drive unit mounted on the roof for actuating the sunshade panel; a first motion detecting unit for detecting a movement and a moving direction of the sunroof panel; a second motion detecting unit for detecting a movement and a moving direction of the sunshade panel; a first pinching detecting unit for detecting a pinching of a foreign object by the sunroof panel; a second pinching detecting unit for detecting a pinching of a foreign object by the sunshade panel; and a control unit that, upon detection of a pinching by one of the sunroof panel and sunshade panel, controls a movement of the other of the sunroof panel and sunshade panel in a manner dependent on a state of at least one of the sunroof panel and sunshade panel.

Thus, the pinching information on one of the sunroof panel and sunshade panel may be favorably utilized for the other of the sunroof panel and sunshade panel to prevent pinching the same foreign object before actually encountering it.

When a pinching of a foreign object by the sunroof panel is detected during a course of a closing movement thereof, the control unit may reverse the movement of the sunroof panel, and move the sunshade panel in the opening direction when the sunshade panel was moving in the closing direction at the time of pinching and hold the sunshade panel stationary if the sunshade panel was stationary at the time of pinching. Conversely, when a pinching of a foreign object by the sunroof panel is detected during a course of an opening movement thereof, the control unit may reverse the movement of the sunroof panel, and move the sunshade panel in the closing direction by a prescribed stroke if the sunshade panel was moving in the opening direction at the time of pinching and hold the sunshade panel stationary if the sunshade panel was stationary at the time of pinching.

It is possible that the sunshade encounters a foreign object before the sunroof panel does. When a pinching of a foreign object by the sunshade panel is detected during a course of a closing movement thereof, the control unit may reverse the movement of the sunshade panel, and move the sunroof panel in the opening direction or hold the sunroof panel stationary when the sunroof panel was moving in the closing direction at the time of pinching and hold the sunroof panel stationary if the sunroof panel was stationary at the time of pinching. When a pinching of a foreign object by the sunshade panel is detected during a course of an opening movement thereof, the control unit may reverse the movement of the sunshade panel, and move the sunroof panel in the closing direction by a prescribed stroke if the sunroof panel was moving in the opening direction at the time of pinching and hold the sunroof panel stationary if the sunroof panel was stationary at the time of pinching.

Typically, the opening direction includes a rearward direction, and the closing direction includes a forward direction.

BRIEF DESCRIPTION OF THE DRAWINGS

Now the present invention is described in the following with reference to the appended drawings, in which.

DETAILED DESCRIPTION OF THE INVENTION

Figure 1:
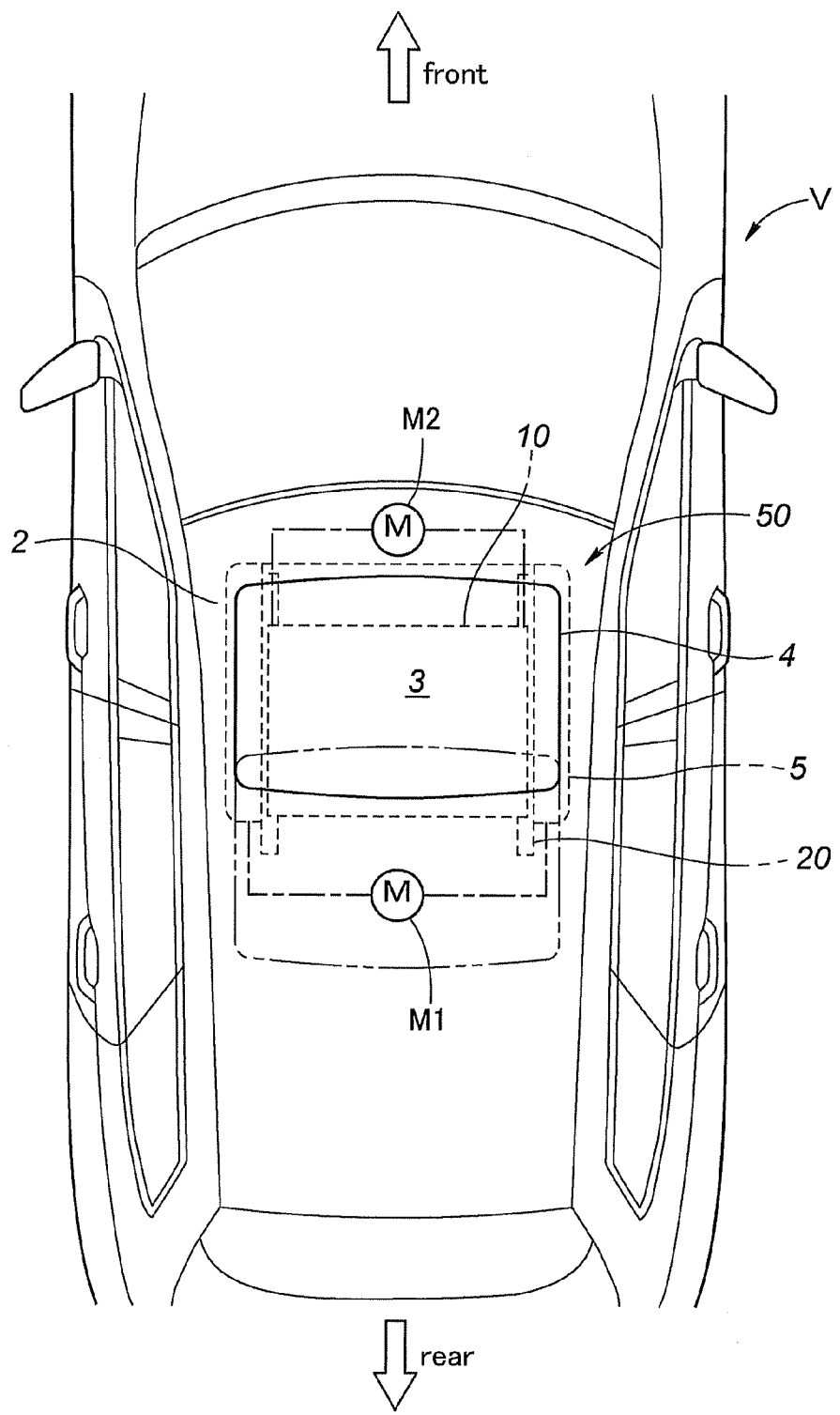
FIG. 1 is a plan view of a sunroof system embodying the present invention.

Referring to FIG. 1 showing a roof 2 of a vehicle V, a sunroof system 50 comprises a pair of guide rails 5 extending in a fore-and-aft direction of the vehicle body along either lateral side of an opening 3 formed in the roof 2, a sunroof panel 4 guided for a fore-and-aft movement by the guide rails 5 and a pair of push-pull cables (not shown in the drawings) that transmit a drive force produced by a sunroof motor unit M1 mounted in a part of the roof immediate behind the rear edge of the opening 3 to the sunroof panel 4. Typically, the sunroof panel 4 is made of transparent material such as sheet glass, possibly fitted with a metallic frame. A pinion fitted on an output shaft of the sunroof motor unit M1 meshes with the push-pull cables so that the cables may be pulled and pushed as required, and the guide rails 5 allow the sunroof panel 4 to be moved in both forward and backward directions in a stable manner.

The sunroof system 50 is additionally provided with a sunshade panel 10 made of at least partially opaque material guide by a pair of sunshade guide rails 20 for a fore-and-aft movement under the sunroof panel 4 so that the sunlight passing through the opening 3 may be shielded when desired. The sunshade guide rails 20 extend in parallel with the sunroof guide rails 5, and guide the lateral edges of the sunshade panel 10 for a fore-and-aft movement in a stable manner. In the illustrated embodiment, a sunshade motor unit M2 is mounted on a part of the roof 2 immediately ahead of the front edge of the opening 3, and a pair of push-pull cables (not shown in the drawings) transmit the drive force of the sunshade motor unit M2 to the sunshade panel 10 so that the sunshade panel 10 can be actuated in a fore-and-aft direction as desired. A pinion fitted on an output shaft of the sunshade motor unit M2 meshes with the push-pull cables so that the cables may be pulled and pushed as required, and the guide rails 20 allow the sunshade panel 10 to be moved in both forward and backward directions in a stable manner.

Figure 4A:
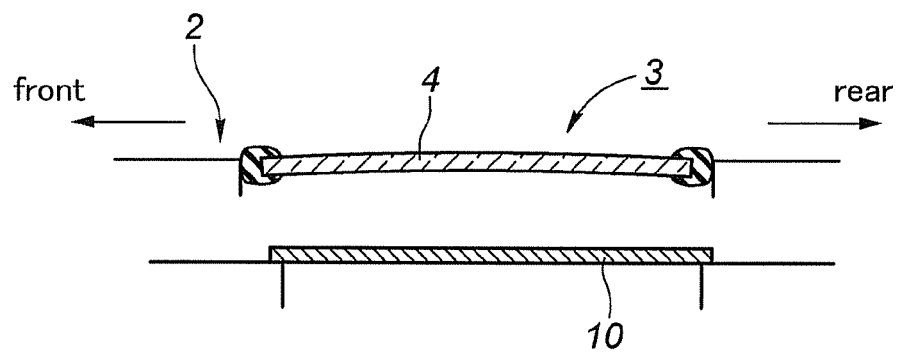
FIG. 4a is a diagram showing the mode of operation of the sunroof system when both the sunroof panel and sunshade panel are fully closed.

FIG. 4a shows the sunroof panel 4 and sunshade panel 10 fully closing the opening 3. When the sunroof panel 4 is desired to be opened, the sunroof panel 4 is initially tilted by raising a rear end thereof, and is then slid rearward until the sunroof panel 4 substantially clears the opening 3. Typically, in the fully open position of the sunroof panel 4, a small part of the front edge of the sunroof panel 4 protrudes into the opening 3. The sunshade panel 10 is located below the sunroof panel 4, and configured to be moved rearward in a substantially horizontal orientation until substantially fully received in a space defined between the fixed roof panel 2 and a roof lining.

Figure 2:
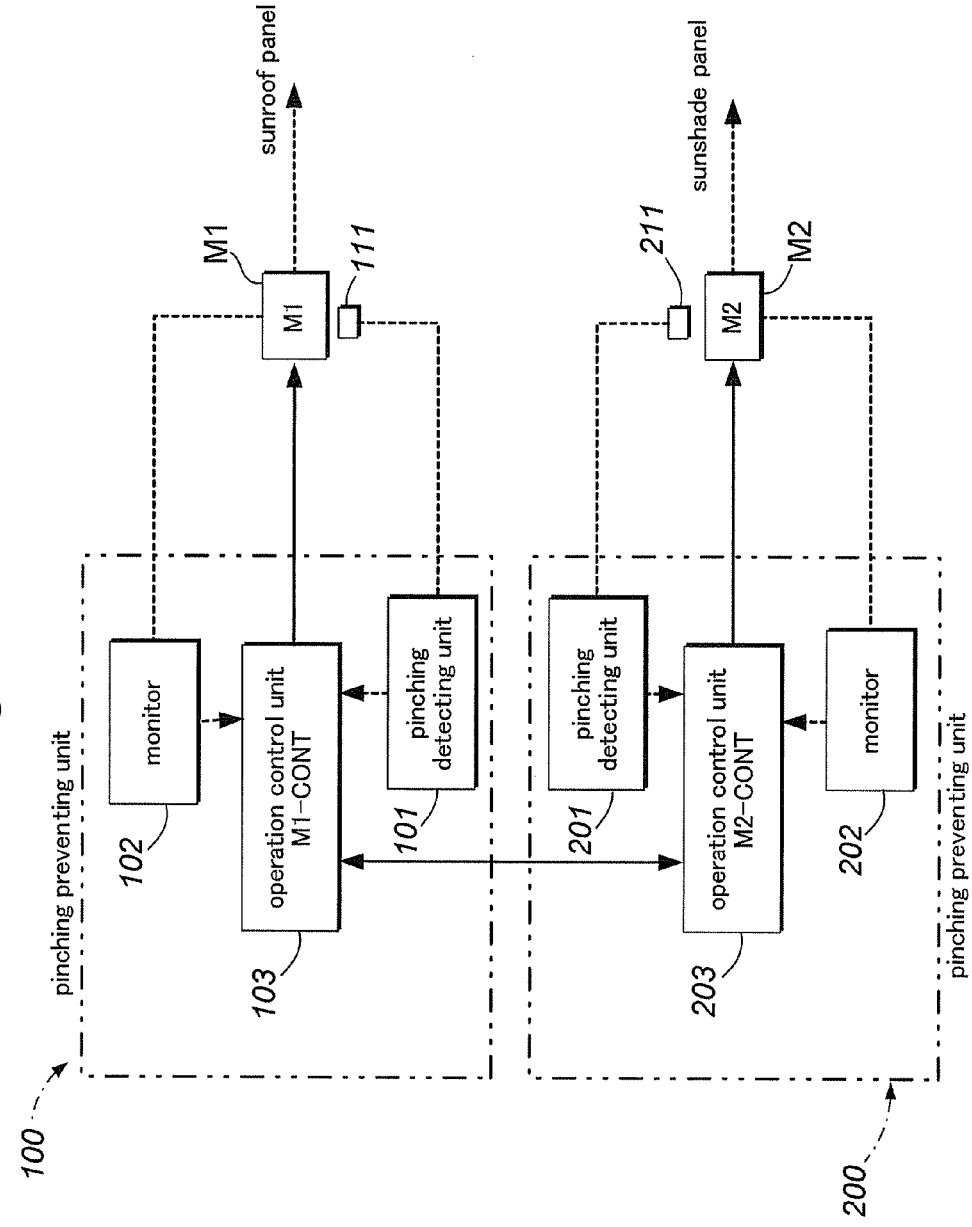
FIG. 2 is a block diagram of a control unit of the sunroof system.

The relevant part of the control unit for the sunroof system 50 is described in the following with reference to FIG. 2. The opening and closing of the sunroof panel 4 and sunshade panel 10 are effected by a vehicle occupant operating an open/close switch not shown in the drawings. The switch signal is forwarded to the control unit which in turn forwards a corresponding command to the drive system for actuating the sunroof panel 4 and sunshade panel 10. More specifically, the switch signal is forwarded to a sunroof panel controller (M1-CONT) 103 to actuate the sunroof panel 4 by using the sunroof motor unit M1 or to a sunshade panel controller (M2-CONT) 203 to actuate the sunshade panel 10 by using the sunshade motor unit M2 as will be described hereinafter.

In the illustrated embodiment, a first pinching preventing unit 100 is interposed between the switch for operating the sunroof panel 4 and sunroof motor unit M1 and a second pinching preventing unit 200 is interposed between the switch for operating the sunshade panel 10 and sunshade motor unit M2 in such a manner that when pinching of a foreign object is detected with respect to one of the panels, not only the one panel involved in the pinching is caused to actuated so as to avoid or mitigate the pinching but also the other panel is actuated so as to prevent a pinching by the other panel from occurring as will be described hereinafter.

The first pinching preventing unit 100 primarily for the sunroof panel 4 includes a sunroof pinching detecting unit 101, a sunroof operation monitor 102 and a sunroof operation control unit 103, and the second pinching preventing unit 200 for the sunshade panel 10 similarly includes a sunshade pinching detecting unit 201, a sunshade operation monitor 202 and a sunshade operation control unit 203. Each pinching preventing unit 100, 200 essentially consists of a microcomputer, and includes central processing unit (CPU) for executing various arithmetic operations, random access memory (RAM) that provides a storage area for temporarily storing various kinds of data and a work area for the arithmetic operations execute by the CPU, read only memory (ROM) storing a program for the CPU and data required for the arithmetic operations and rewritable non-volatile memory for storing the results of the arithmetic operations executed by the CPU and some of the data obtained from various parts of the system that are required to be stored. The non-volatile memory may also consist of RAM equipped with a backup power that allows the data to be maintained even after the system is shut down.

Each pinching detecting unit 101, 201 receives a signal from a pinching sensor 111, 211 provided in the corresponding motor unit M1, M2, and upon detection of a pinching, forwards a detection signal to the sunroof panel controller (M1-CONT) 103 or sunshade panel controller (M2-CONT) 203, as the case may be, to actuate the corresponding panel 4, 10. The pinching detecting unit 101, 201 may be configured to determine a pinching when the load (electric current) of the corresponding motor unit M1, M2 has exceeded a prescribed threshold value as disclosed in patent documents 2 and 3, for instance.

Each operation monitor 102, 202 receives a control signal from the corresponding motor unit M1, M2 and determines if the sunroof panel 4 or sunshade panel 10 is being actuated or stationary, and, when the panel is moving, the moving direction of the corresponding panel 4, 10. The information on the state of operation of the sunroof panel 4 and sunshade panel 10 is forwarded to the operation control units 103, 203.

By executing appropriate operations according to the inputs from the pinching detecting units 101, 201 and operation monitors 102 and 202, and the program and data stored in the ROM, the operation control units 103, 203 compute the respective control values which are forwarded to the motor units M1 and M2. When one of the operation control units 103 and 203 has received pinching information from the corresponding pinching detecting unit 101, 201 and information on the state of the sunroof panel 4 and sunshade panel 10, the operation control units 103 and 203 forward control signals to the motor units M1 and M2 to stop or reverse the movement of both or one of the sunroof panel 4 and sunshade panel 10.

Upon receiving control signals from the operation control units 103 and 203, the motor units M1 and M2 are operated in a corresponding manner. Thus, in the illustrated embodiment, depending on the situation in which a foreign object is pinched by the sunroof panel 4 or sunshade panel 10, the first and second pinching preventing units 100 and 200 control the movements of the sunroof panel 4 and sunshade panel 10 in a mutually coordinated manner, and when a pinching of a foreign object by one of the panels is detected, a pinching of the same foreign object by the other panel can be prevented.

In the illustrated embodiment, the sunroof system 50 is configured such that the sunshade panel 10 is prohibited to be closed when the sunroof panel 4 is open. For instance, when the sunroof panel 4 is closed, the sunshade panel 10 can be opened and closed at will. When the sunroof panel 4 is open, the sunshade panel 10 is prohibited from being closed. When the sunroof panel 4 and sunshade panel 10 are both closed, and the sunroof panel 4 is opened from this state, the sunshade panel 10 is forced to be opened at the same time. When the sunroof panel 4 and sunshade panel 10 are both open, and the sunroof panel 4 is closed from this state, the sunshade panel 10 is allowed to remain open. This is a typical mode of operation of the sunroof system under a normal condition, but the present invention is equally applicable also when the mode of operation of the sunroof system is modified from this typical mode.

The mode of operation of the sunroof system of the illustrated embodiment including a routine of detecting a pinching is described in the following with reference to the flowchart of FIG. 3 and the diagrams of FIGS. 4 to 8.

Figure 3:
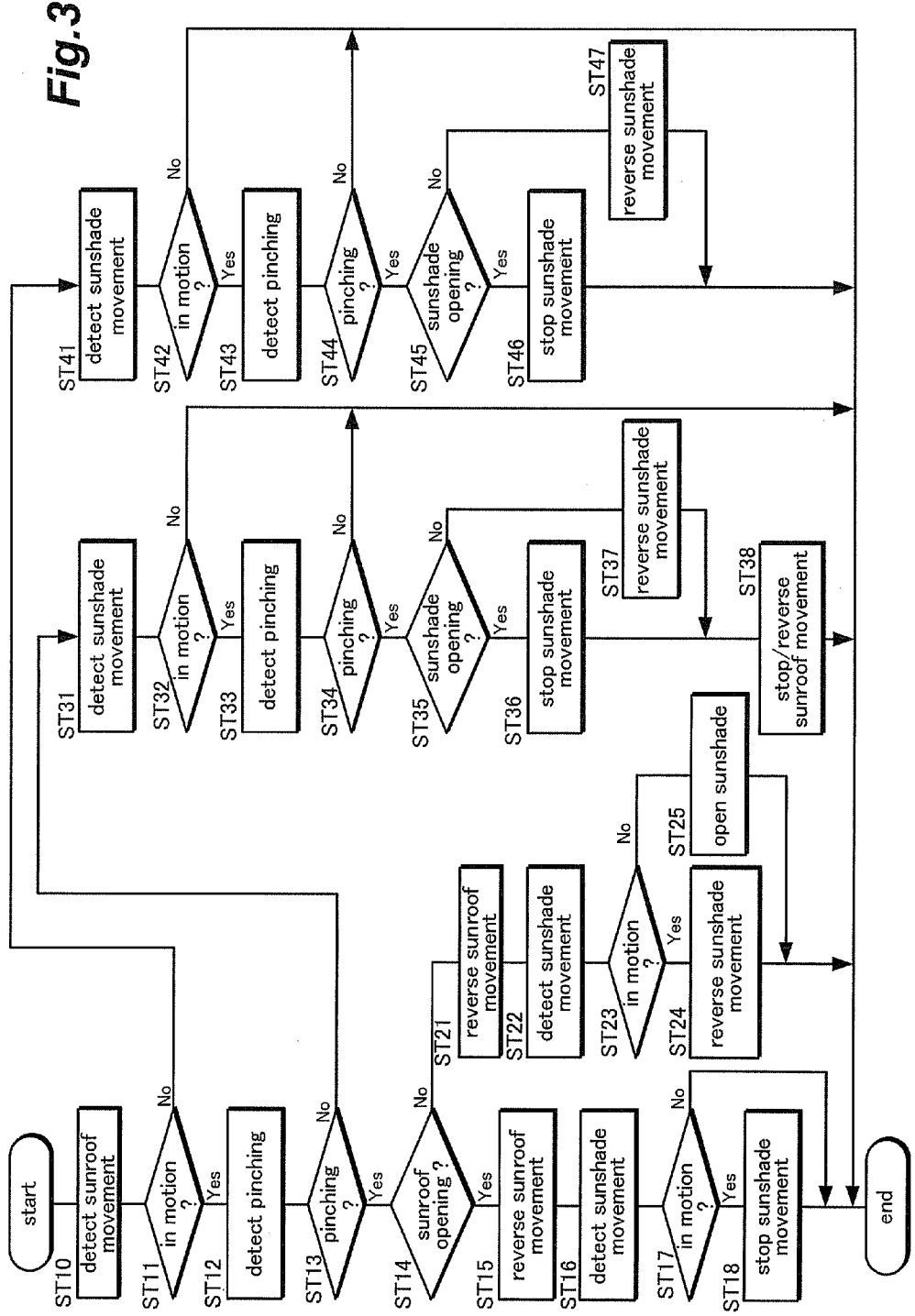
FIG. 3 is a flowchart showing the control process executed by the control unit.

The pinching preventing units 100 and 200 which essentially consist of a CPU operating under an appropriate computer program execute a pinching preventing process which is illustrated in the flowchart of FIG. 3 at a prescribed control cycle (10 ms, for instance) during the time the control system of the vehicle is in operation.

The sunroof operation monitor 102 of the first pinching preventing unit 100 receives a signal from the sunroof motor unit M1 to monitor the operating condition of the sunroof panel 4 (step ST10) and determines if the sunroof panel 4 is in motion (step ST11). When the sunroof panel 4 is in motion (step ST11: yes), the pinching detecting unit 101 receives a signal from a pinching sensor 111 (step ST12) and determines if a pinching of a foreign object by the sunroof panel 4 has occurred (step ST13). When the sunroof panel 4 is stationary (step ST11: no), the program flow advances to a routine for detecting the operating condition of the sunshade panel 10 or to step ST41 which will be described hereinafter.

Figure 4B:
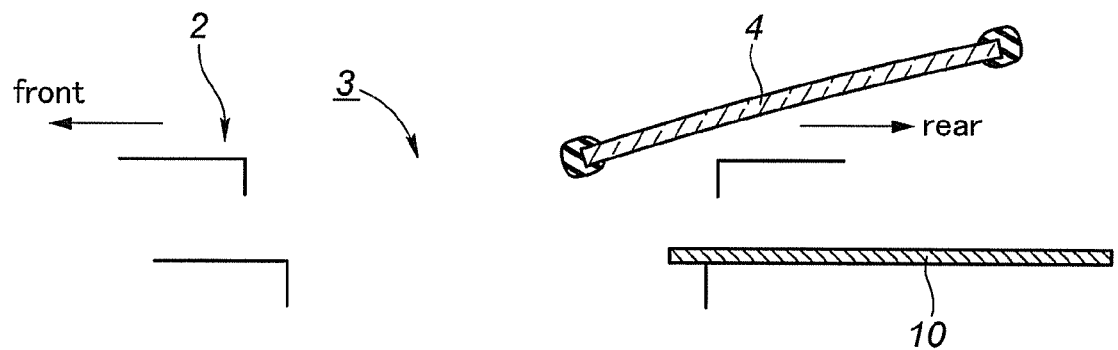
FIG. 4b is a view similar to FIG. 4a when both the sunroof panel and sunshade panel are fully open.

When a pinching of a foreign object by the sunroof panel 4 has occurred (step ST13: yes), the sunroof operation monitor 102 determines the direction of the movement of the sunroof panel (step ST14) which may be either in the opening direction or in the closing direction. The opening direction means that the sunroof panel 4 is in the process of tilting up from the fully closed state illustrated in FIG. 4a and moving rearward until the roof opening is made fully open as illustrated in FIG. 4b. The closing direction means that the sunroof panel 4 is in the process of moving forward from the fully open position illustrated in FIG. 4b and upon reaching the stroke of the forward movement, tilting down to the fully closed state illustrated in FIG. 4a. When no pinching is detected (step ST13: no), the program flow advances to the routine of monitoring the operating state of the sunshade panel 10 or to step ST31 as will be described hereinafter.

Figure 5A:
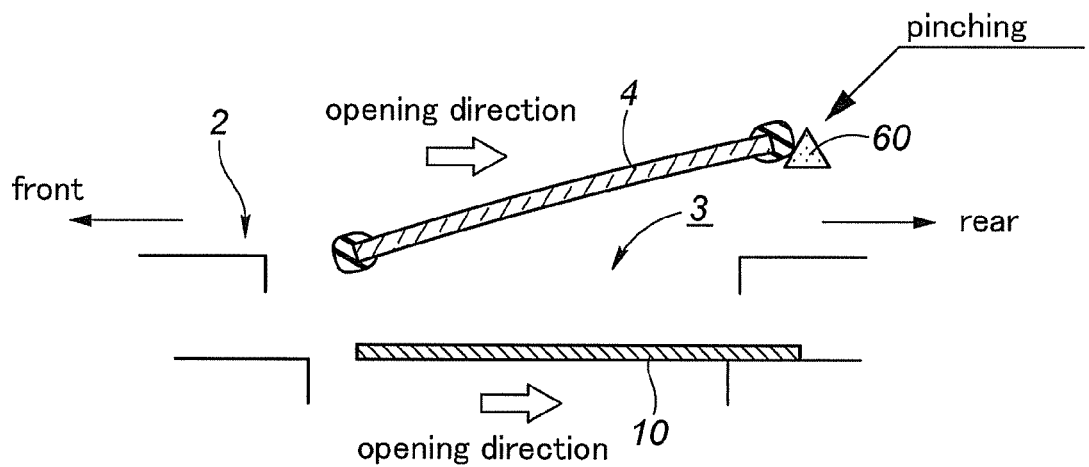
FIG. 5a is a view similar to FIG. 4a showing a case where the sunroof panel has encountered an obstacle during an opening movement thereof while the sunshade panel is also moving in the opening direction.

Referring to FIG. 5a, when the sunroof panel 4 is moving in the opening direction (step ST14: yes), a foreign object 60 could be caught by the opening movement of the sunroof panel 4 and pinched between the sunroof panel 4 and part of the fixed roof 2 or a roof carrier (not shown in the drawings) attached thereto. The foreign object 60 may possibly consist of a tree branch drooping onto the sunroof panel or any loose member hanging from a ceiling of a garage, for example.

Upon detecting a pinching of a foreign object 60 during the opening movement of the sunroof panel 4, the sunroof operation control unit 103 forwards a command to the sunroof motor unit M1 to reverse the movement of the sunroof panel 4 (or in the closing direction) by a prescribed distance (step ST15). Thereby, the foreign object 60 can be dislodged from the pinched state or the pressure applied to the foreign object 60 can be reduced.

Figure 5B:
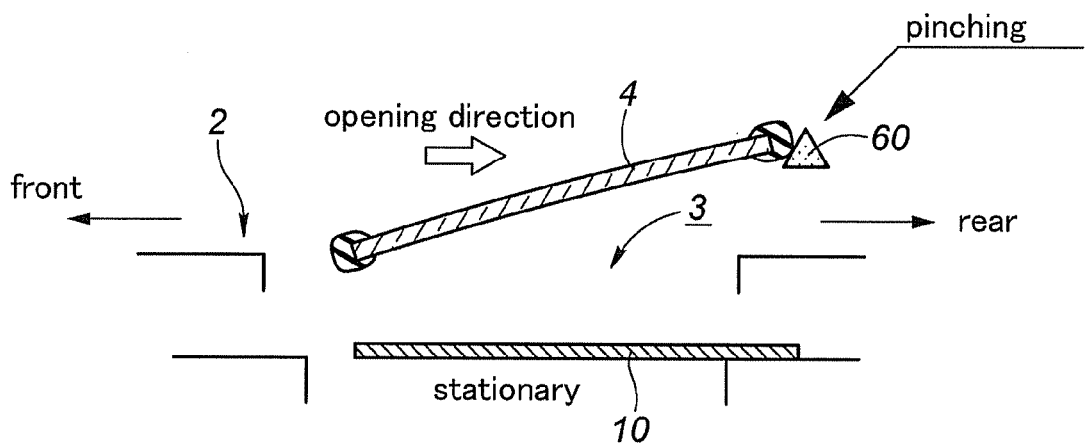
FIG. 5b is a view similar to FIG. 4a showing a case where the sunroof panel has encountered an obstacle during an opening movement thereof while the sunshade panel is stationary.

The information on the pinching of the foreign object 60 by the sunroof panel 4 is forwarded from the sunroof operation control unit 103 for the sunroof panel 4 to the sunshade operation control unit 203 for the sunshade panel 10. The sunshade operation monitor 202 receives a signal from the sunshade motor unit M2 for the sunshade panel 10 (step ST16) and determines if the sunshade panel 10 is in motion (step ST17). At this time, the direction of movement of the sunshade panel 10 is necessarily the same as that of the sunroof panel 4 when the pinching occurred or in the opening direction. As shown in FIG. 5a, if the sunshade panel 4 was in motion (step ST17: yes), the sunshade panel 4 is brought to a stop (step ST18). As shown in FIG. 5b, if the sunshade panel 4 was stationary (step ST17: no), the sunshade panel 4 is kept stationary. In either case, the pinching detection routine is concluded. Thus, upon detecting a pinching by the sunroof panel 4, the sunshade panel 10 is prevented from pinching the same object by appropriately coordinating the movement of the sunshade panel 10 in relation with the state of the sunroof panel 4.

Figure 6A:
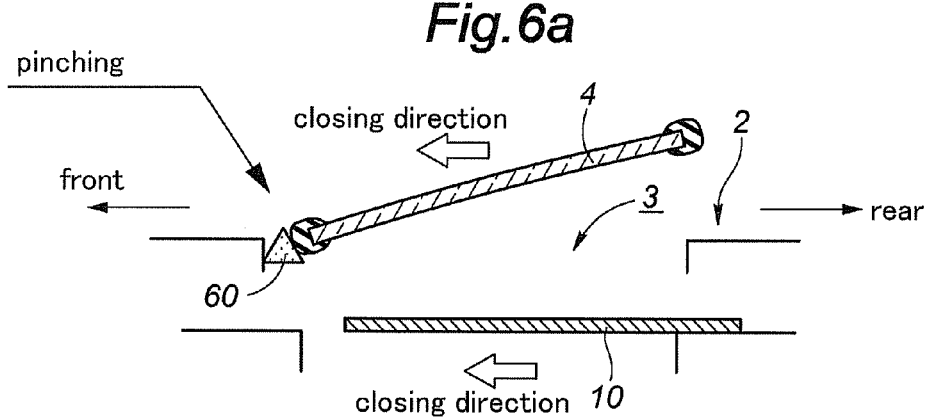
FIG. 6a is a view similar to FIG. 4a showing a case where the sunroof panel has encountered an obstacle during a closing movement thereof while the sunshade panel is also moving in the closing direction.

Referring to FIG. 6a, when the sunroof panel 4 is moving in the closing direction (step ST14: no), a foreign object 60 could be pinched between the leading edge of the sunroof panel 4 and opposing edge of the roof opening 3. The foreign object 60 in this case could be a hand or fingers of a vehicle occupant stuck out from the cabin, as well as a tree branch drooping into the roof opening 3 or any loose member hanging from a ceiling of a garage, for example.

When the sunroof panel 4 is moving in the closing direction (step ST14: no), the sunroof operation control unit 103 forwards a command to the sunroof motor unit M1 to reverse the movement of the sunroof panel 4 to move the sunroof panel 4 in the opening direction (step ST21). Thereby, the foreign object 60 is prevented from being pinched by the sunroof panel 4.

The sunshade operation monitor 202 receives a signal from the sunshade motor unit M2 (step ST22) and determines if the sunshade panel 10 is in motion (step ST23). The direction of movement of the sunshade panel 10 at this time is necessarily the same as the sunroof panel 4 when the pinching occurred or in the closing direction.

When the sunshade panel 10 was moving in the closing direction as illustrated in FIG. 6a (step ST23: yes), the sunshade operation control unit 203 forwards a command to the sunshade motor unit M2 to reverse the movement of the sunshade panel 10 or move the sunshade panel 10 in the opening direction (step ST24). Thereby, the foreign object 60 is prevented from being pinched by the sunshade panel 10.

Figure 6B:
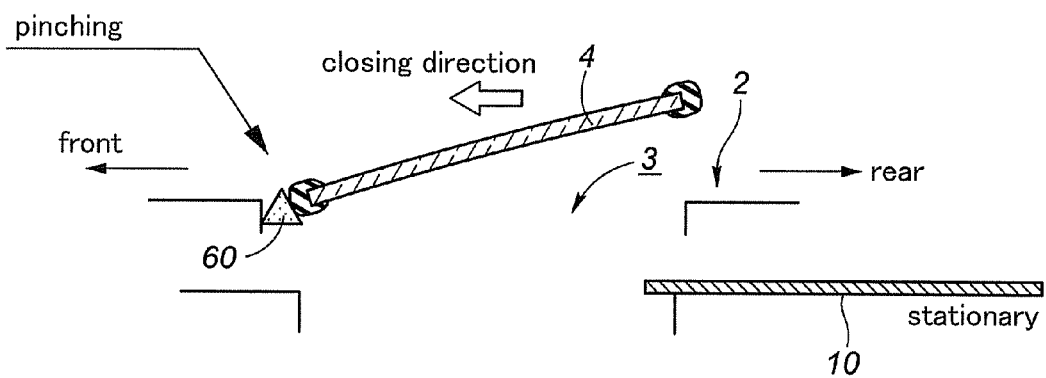
FIG. 6b is a view similar to FIG. 4a showing a case where the sunroof panel has encountered an obstacle during a closing movement thereof while the sunshade panel is stationary.

When the sunshade panel 10 was stationary as illustrated in FIG. 6b or in the fully open condition (step ST23: no), the sunshade operation control unit 203 forwards a command to the sunshade motor unit M2 to maintain the sunshade panel 10 in the fully open condition if the sunshade panel 10 was fully open at this time or move the sunshade panel 10 in the opening direction if the sunshade panel 4 was stationary at an intermediate position between the fully open condition and fully closed condition. This concludes the pinching prevention routine. Thereby, when the sunroof panel 4 encounters a foreign object 60, not only the sunroof panel 4 is moved in the direction to avoid pinching the foreign object 60 or mitigate the pinching of the foreign object 60, but also the same foreign object 60 is prevented from being pinched by the sunshade panel 10 by taking into account the state of the sunshade panel 10.

In the following is described the control flow when the roof panel 4 is in motion (step ST11: yes) and pinching by the roof panel 4 has not occurred (step ST13: no). The sunshade operation monitor 202 receives a signal from the sunshade motor unit M2 (step ST31) and determines if the sunshade panel 10 is in motion (step 32).

If the sunshade panel 10 is in motion (step ST32: yes), the sunshade pinching detecting unit 201 receives a signal from the pinching sensor 211 (step ST33) and determines if a pinching by the sunshade panel 10 has occurred (step ST34). If the sunshade panel 10 is stationary (step ST32: no), the pinching detecting routine is concluded as no pinching could occur. If there is no pinching, the pinching detecting routine is also concluded (step ST34: no).

If a pinching by the sunshade panel 10 is detected (step ST34: yes), the sunshade operation monitor 202 determines the direction of movement of the sunshade panel 10 prior to the occurrence of the pinching (step ST35).

Figure 7A:
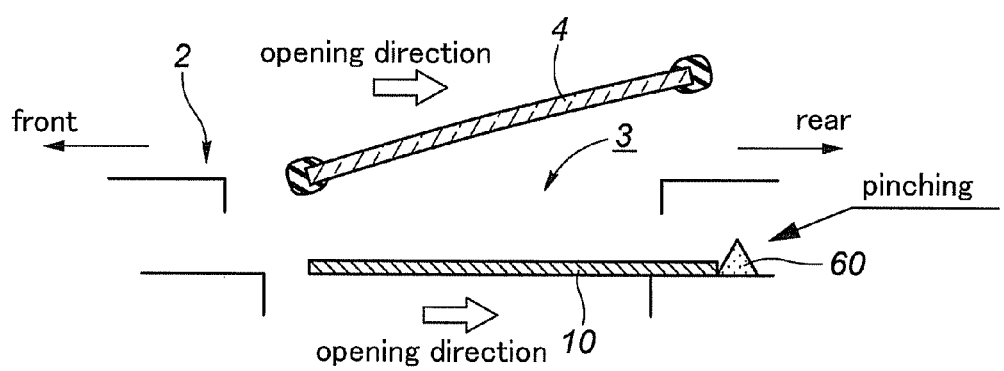
FIG. 7a is a view similar to FIG. 4a showing a case where the sunshade panel has encountered an obstacle during an opening movement thereof while the sunroof panel is also moving in the opening direction.

Referring to FIG. 7a, when the sunshade panel 10 is moving in the opening direction (step ST35; yes), a foreign object 60 could be caught by the sunshade panel 10 and pulled into a space between the sunshade panel 10 and roof lining. The foreign object 60 could be a piece of trash introduced from the roof opening 3 or an object located inside the cabin.

If the sunshade panel 10 is moving in the opening direction (step ST35; yes), the sunshade operation control unit 203 forwards a command to the sunshade motor unit M2 to hold the sunshade panel 10 in the stationary condition (step ST36).

Figure 8A:
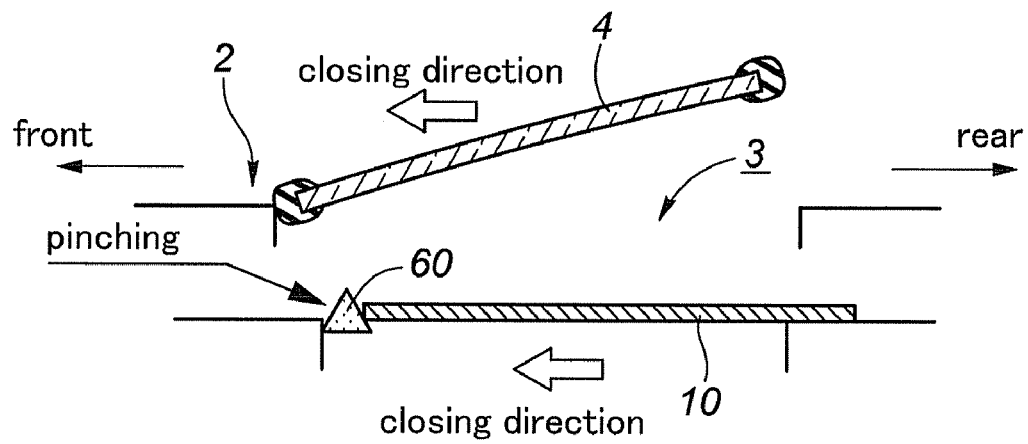
FIG. 8a is a view similar to FIG. 4a showing a case where the sunshade panel has encountered an obstacle during a closing movement thereof while the sunroof panel is also moving in the closing direction.

Referring to FIG. 8a, when the sunshade panel 10 is moving in the closing direction (step ST35; yes), a foreign object 60 could be pinched between the leading edge of the sunshade panel 10 and opposing edge of the roof opening. The foreign object 60 may consist of a finger or hand of a vehicle occupant or an object drooping into the roof opening from outside such as a tree branch and a projection of a ceiling of a parking garage.

If the sunshade panel 10 is moving in the closing direction (step ST35; no), the sunshade operation control unit 203 forwards a command to the sunshade motor unit M2 to reverse the movement of the sunshade panel 10 or move the sunshade panel 10 in the opening direction (step ST37).

The information on the pinching of a foreign object by the sunshade panel 10 is forwarded from the sunshade operation control unit 203 to the sunroof panel operation control unit 103. At this time, because the sunroof panel 4 is in motion, following step ST36 or ST37, as the case may be, the sunroof panel operation control unit 103 forwards a command to the sunroof motor unit M1 to bring the sunroof panel 4 to a stop or to reverse the movement of the sunroof panel 4 (step ST38). This concludes the pinching prevention routine. According to this routine, not only the pinching by the sunshade panel 10 can be avoided, but also the sunroof panel 10 is prevented from pinching the same foreign object 60 before actually encountering it. At this time, the sunroof panel 4 may be stopped or reversed depending on the particular position of the sunroof panel 4.

In the following is described the case where the sunroof panel 4 is stationary (step ST11: no). The sunshade operation monitor 202 receives a signal from the sunshade motor unit M2 (step ST41) and determines if the sunshade panel 10 is in motion (step ST42).

When the sunshade panel 10 is in motion (step ST42: yes), the pinching detecting unit 201 receives a signal from the pinching sensor 211 (step ST43) and determines if a pinching by the sunshade panel 4 has occurred (step ST44). If the sunshade panel 10 is stationary (step ST42: no), the pinching prevention routine is concluded because a pinching could not occur. When no pinching is detected (step ST44: no), the pinching prevention routine is concluded also.

When a pinching of a foreign object 60 by the sunshade panel 10 is detected (step ST44: yes), the sunshade operation monitor 202 determines the direction of motion of the sunshade panel 10 (step ST45).

Figure 7B:
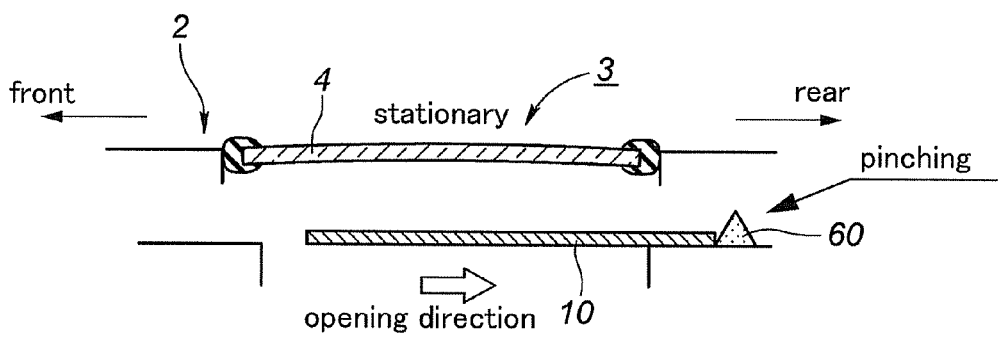
FIG. 7b is a view similar to FIG. 4a showing a case where the sunshade panel has encountered an obstacle during an opening movement thereof while the sunroof panel is stationary.

Referring to FIG. 7b, when the sunshade panel 10 is moving in the opening direction (step ST45: yes), a foreign object 60 could be caught by the sunshade panel 10 and pulled into a space between the sunshade panel 10 and roof lining. The foreign object 60 could originate from outside the vehicle or inside the vehicle as discussed previously in conjunction with different modes of pinching.

If the sunshade panel 10 is moving in the opening direction (step ST45: yes), the sunshade operation control unit 203 forwards a command to the sunshade motor unit M2 to stop the movement of the sunshade panel 10 (step ST46).

Figure 8B:
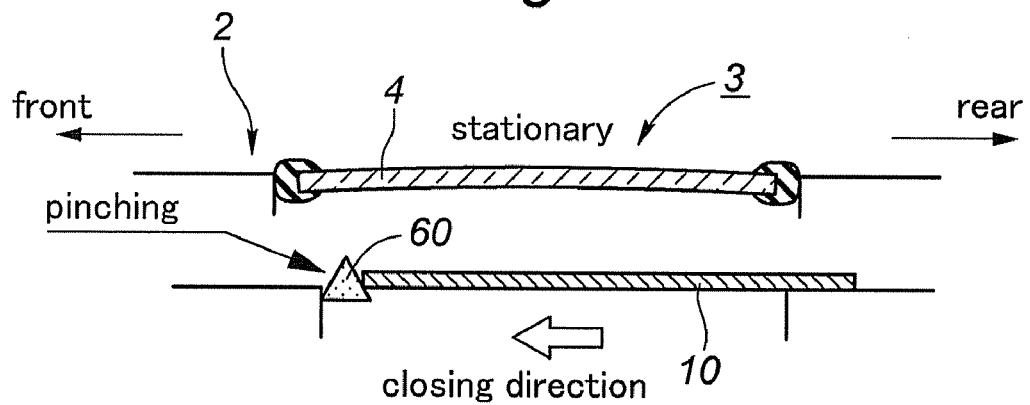
FIG. 8b is a view similar to FIG. 4a showing a case where the sunshade panel has encountered an obstacle during a closing movement thereof while the sunroof panel is stationary.

Referring to FIG. 8b, when the sunshade panel 10 is moving in the closing direction (step ST45; no), a foreign object 60 could be pinched between the leading edge of the sunshade panel 10 and opposing edge of the roof opening 3. The foreign object 60 may consist of a finger or hand of a vehicle occupant or an object drooping into the roof opening from outside such as a tree branch and a projection of a ceiling of a parking garage.

If the sunshade panel 10 is moving in the closing direction (step ST45; no), the sunshade operation control unit 203 forwards a command to the sunshade motor unit M2 to reverse the movement of the sunshade panel 10 or move the sunshade panel 10 in the opening direction (step ST47). According to this routine, not only the pinching by the sunshade panel 10 can be avoided, but also the sunroof panel 10 is prevented from pinching the same foreign object 60 before actually encountering it.

Although the present invention has been described in terms of a preferred embodiment thereof, it is obvious to a person skilled in the art that various alterations and modifications are possible without departing from the scope of the present invention which is set forth in the appended claims.

The contents of the original Japanese patent application on which the Paris Convention priority claim is made for the present application are incorporated in this application by reference.

The invention claimed is:

1. A sunroof system, comprising:
a sunroof panel disposed on a fixed roof of a vehicle so as to be selectively moveable in an opening direction to expose an opening formed in the fixed roof and a closing direction to close the opening;
a sunshade panel disposed on the fixed roof of the vehicle under the sunroof panel so as to be selectively moveable in an opening direction to expose the opening and a closing direction to close the opening;
a first drive unit mounted on the roof for actuating the sunroof panel;
a second drive unit mounted on the roof for actuating the sunshade panel;
a first motion detecting unit for detecting a movement and a moving direction of the sunroof panel;
a second motion detecting unit for detecting a movement and a moving direction of the sunshade panel;
a sunroof pinching detecting unit for detecting a pinching of a foreign object by the sunroof panel;
a sunshade pinching detecting unit for detecting a pinching of a foreign object by the sunshade panel; and
a control unit that controls the movement of both the sunroof panel and sunshade panel;
wherein, when a pinching of a foreign object by the sunroof panel is detected during a course of a closing movement thereof, the control unit reverses the movement of the sunroof panel, and moves the sunshade panel in the opening direction when the sunshade panel was moving in the closing direction at the time of pinching, and moves the sunshade panel in the opening direction if the sunshade panel was stationary at the time of pinching.

2. The sunroof system according to claim 1, wherein, when a pinching of a foreign object by the sunroof panel is detected during a course of an opening movement thereof, the control unit reverses the movement of the sunroof panel, and moves the sunshade panel in the closing direction by a prescribed stroke if the sunshade panel was moving in the opening direction at the time of pinching and holds the sunshade panel stationary if the sunshade panel was stationary at the time of pinching.

3. The sunroof system according to claim 1, wherein, when a pinching of a foreign object by the sunshade panel is detected during a course of a closing movement thereof, the control unit reverses the movement of the sunshade panel, and moves the sunroof panel in the opening direction or holds the sunroof panel stationary when the sunroof panel was moving in the closing direction at the time of pinching and holds the sunroof panel stationary if the sunroof panel was stationary at the time of pinching.

4. The sunroof system according to claim 1, wherein, when a pinching of a foreign object by the sunshade panel is detected during a course of an opening movement thereof, the control unit reverses the movement of the sunshade panel, and moves the sunroof panel in the closing direction by a prescribed stroke if the sunroof panel was moving in the opening direction at the time of pinching and holds the sunroof panel stationary if the sunroof panel was stationary at the time of pinching.

5. The sunroof system according to claim 1, wherein the opening direction includes a rearward direction, and the closing direction includes a forward direction.

* * * * *